United States Patent
Abuhaikal et al.

(10) Patent No.: US 11,919,754 B2
(45) Date of Patent: Mar. 5, 2024

(54) AUTOMATED SPOOLING CONTROL SYSTEM USING STOCHASTIC INFERENCE

(71) Applicant: Schlumberger Technology Corporation, Sugar Land, TX (US)

(72) Inventors: Muhannad Abuhaikal, Cambridge, MA (US); Tianxiang Su, Cambridge, MA (US); Chris Bogath, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 42 days.

(21) Appl. No.: 17/175,201

(22) Filed: Feb. 12, 2021

(65) Prior Publication Data
US 2022/0144606 A1 May 12, 2022

Related U.S. Application Data

(60) Provisional application No. 63/111,909, filed on Nov. 10, 2020.

(51) Int. Cl.
*B66D 1/48* (2006.01)
*E21B 19/00* (2006.01)
*G05B 13/02* (2006.01)

(52) U.S. Cl.
CPC ............ *B66D 1/485* (2013.01); *E21B 19/008* (2013.01); *G05B 13/0275* (2013.01); *B66D 2700/0191* (2013.01)

(58) Field of Classification Search
None
See application file for complete search history.

(56) References Cited

U.S. PATENT DOCUMENTS

| 5,767,671 A | 6/1998 | McCoy et al. |
| 2001/0020663 A1 | 9/2001 | Petersen et al. |
| 2003/0006332 A1* | 1/2003 | Appleby .............. G02B 6/4479 242/362.2 |
| 2003/0118230 A1 | 6/2003 | Song et al. |

(Continued)

FOREIGN PATENT DOCUMENTS

| EP | 0573656 A1 | 12/1993 |
| JP | 02221068 A1 | 9/1990 |

(Continued)

OTHER PUBLICATIONS

International Search Report and Written Opinion issued in PCT Application PCT/US2021/058721 dated Feb. 25, 2022, 9 pages.

(Continued)

*Primary Examiner* — Bernard G Lindsay
(74) *Attorney, Agent, or Firm* — Jeffrey D. Frantz

(57) ABSTRACT

A system and method that is configured to automatically control a spooling of a drum of a deployment unit used in hydrocarbon recovery operations. The method may comprise obtaining data related to a sensor and measurements system connected to the deployment unit. Processing the data obtained by the sensor and measurements system in a processing unit that makes a stochastic inference. Controlling an auto spooling of the drum of the deployment unit through an auto-spooling controller connected to the deployment unit based upon the stochastic inference.

9 Claims, 18 Drawing Sheets

(56) References Cited

U.S. PATENT DOCUMENTS

| | | | | |
|---|---|---|---|---|
| 2006/0238934 | A1* | 10/2006 | Kleine | B66C 15/065 |
| | | | | 361/51 |
| 2010/0097450 | A1 | 4/2010 | Pugh et al. | |
| 2010/0201970 | A1* | 8/2010 | Pellen | G01B 11/26 |
| | | | | 356/138 |
| 2013/0044936 | A1 | 2/2013 | Wang | |
| 2013/0284434 | A1 | 10/2013 | Marvel | |
| 2015/0256797 | A1 | 9/2015 | Torben | |
| 2017/0115423 | A1* | 4/2017 | Hori | G01V 1/50 |
| 2021/0070590 | A1* | 3/2021 | Iwashita | B66D 1/36 |
| 2021/0164301 | A1 | 6/2021 | Su et al. | |

FOREIGN PATENT DOCUMENTS

| | | |
|---|---|---|
| WO | 2009047719 A2 | 4/2009 |
| WO | 2014068084 A1 | 5/2014 |
| WO | 2021072059 A1 | 4/2021 |

OTHER PUBLICATIONS

International Preliminary Report on Patentability issued in International Patent Application No. PCT/US2021/058721 dated May 25, 2023, 6 pages.

Canziani et al., "An Analysis of Deep Neural Network Models for Practical Applications", Apr. 2017, 7 pages. arXiv:1605.07678, available at: https://arxiv.org/pdf/1605.07678.pdf?source=post_page.

Carreira et al., "Quo Vadis, Action Recognition? A New Model and the Kinetics Dataset", CVPR, 2017, pp. 6299-6308. available at: https://openaccess.thecvf.com/content_cvpr_2017/papers/Carreira_Quo_Vadis_Action_CVPR_2017_paper.pdf.

Donahue et al., Long-term recurrent convolutional networks for visual recognition and description, CVPR, 2015, pp. 2625-2634, arXiv:1411.4389. available at: https://openaccess.thecvf.com/content_cvpr_2015/papers/Donahue_Long-Term_Recurrent_Convolutional_2015_CVPR_paper.pdf.

Gal, "Uncertainty in Deep Learning", Ph.D. Thesis, University of Cambridge, Sep. 2016, 174 pages.

International Search Report and Written Opinion issued in International Patent Application No. PCT/US2020/054763 dated Jan. 25, 2021; 9 pages.

Ioffe et al., "Batch Normalization: Accelerating Deep Network Training by Reducing Internal Covariate Shift", 2015, 11 pages.

Kading et al., "Fine-Tuning Deep Neural Networks in Continuous Learning Scenarios", ACCV 2016 Workshop on Interpretation and Visualization of Deep Neutral Nets, 2016, 17 pages. Available at: https://pub.inf-cv.uni-jena.de/pdf/Kading16_FDN.pdf.

Kingma et al., "Adam: A Method for Stochastic Optimization", ICLR 2015, Jan. 2017, 15 pages. Available at: https://arxiv.org/pdf/1412.6980.pdf?source=post_page.

Liu et al., "Dyan: A Dynamical Atoms-Based Network for Video Prediction", ECCV 2018, Sep. 2018, 16 pages. arXiv:1803.07201. Available at: https://arxiv.org/pdf/1803.07201.pdf.

Simonyan et al., "Two-Stream Convolutional Networks for Action Recognition in Videos", NIPS, 2014, 9 pages. Available at: https://papers.nips.cc/paper/2014/file/00ec53c4682d36f5c4359f4ae7bd7ba1-Paper.pdf.

Srivastava et al., "Dropout: A Simple Way to Prevent Neural Network from Overfitting", Journal of Machine Learning Research, vol. 15, 2014, pp. 1929-1958.

Xie et al., "Rethinking Spatiotemporal Feature Learning: Speed-Accuracy Trade-offs in Video Classification", 2018, 17 pages. arXiv: 1712.04851. Available at: https://arxiv.org/pdf/1712.04851.pdf.

Zhu et al., "Hidden Two-Stream Convolutional Networks for Action Recognition", Oct. 2018, 16 pages. arXiv:1704.00389, Available at: https://arxiv.org/pdf/1704.00389.pdf.

International Preliminary Report on Patentability issued in International Patent Application No. PCT/US2020/054763 dated Apr. 21, 2022; 7 pages.

Li et al. 2018, Understanding the Disharmony between Dropout and Batch Normalization by Variance Shift (9 pages).

Office Action issued in U.S. Appl. No. 17/175,238 dated Aug. 1, 2023, 13 pages.

Extended Search Report issued in European Patent Application No. 20875050.5 dated Sep. 18, 2023, 6 pages.

* cited by examiner

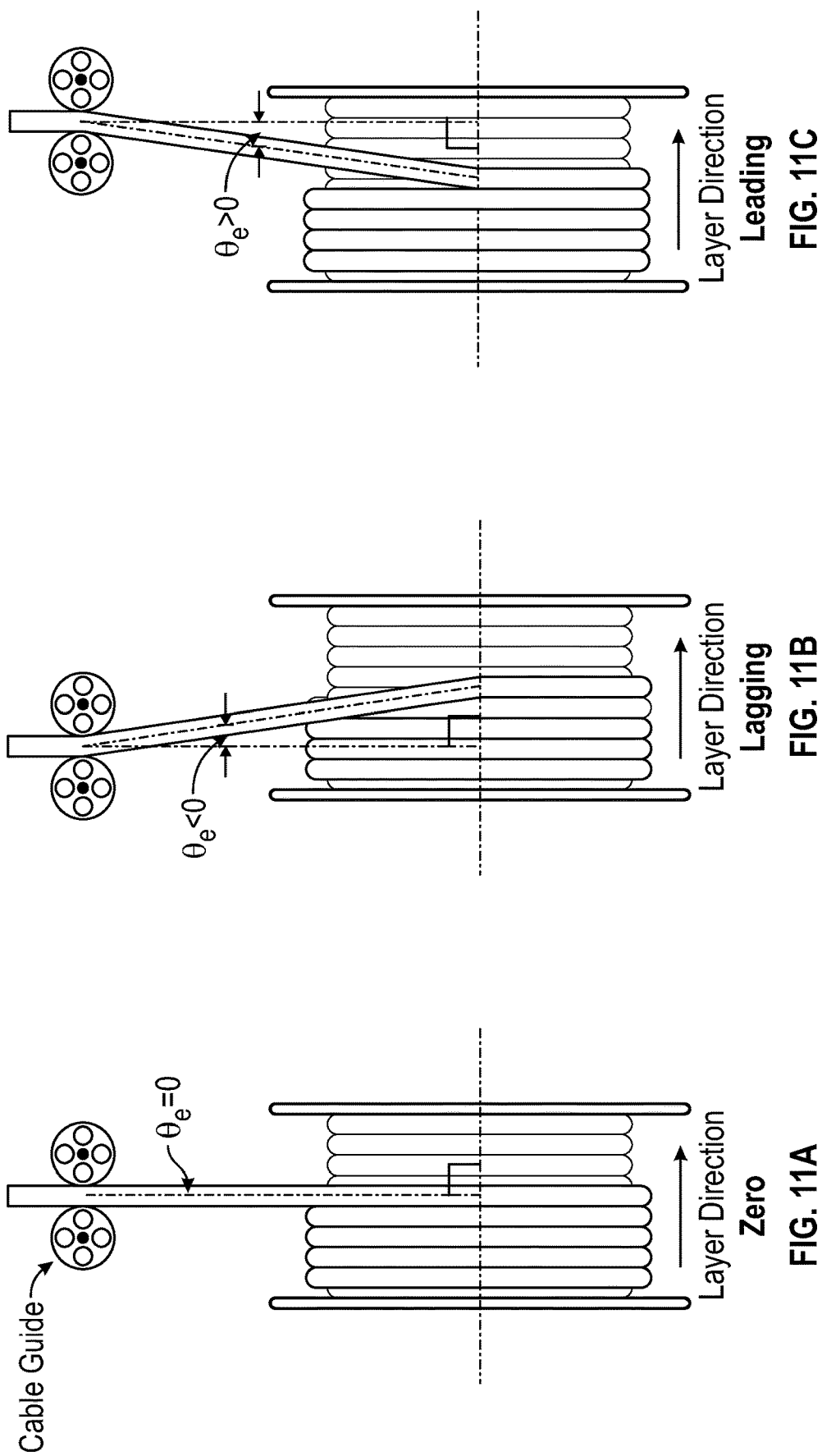

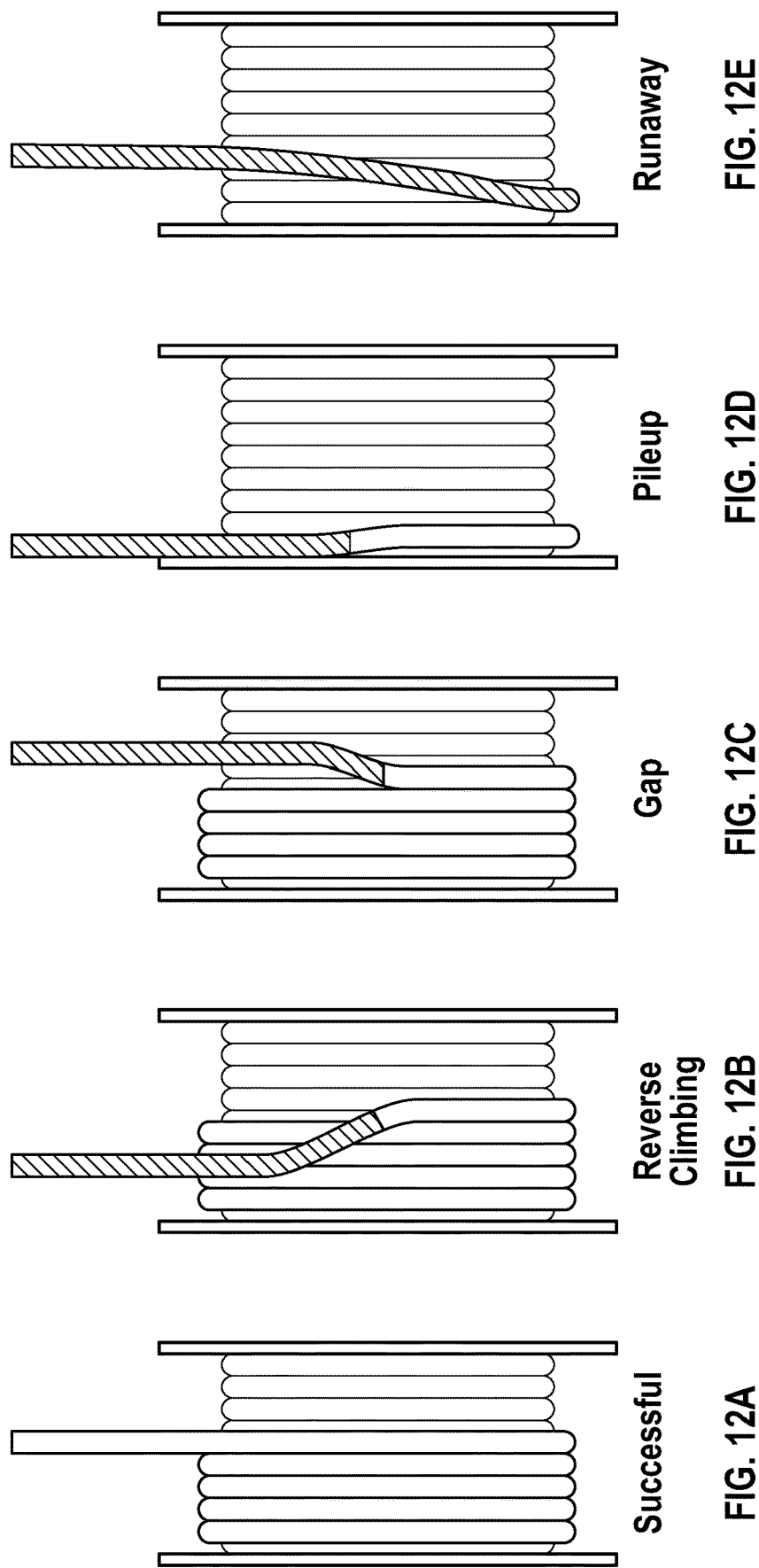

AUTOMATED SPOOLING CONTROL SYSTEM USING STOCHASTIC INFERENCE

CROSS-REFERENCE TO RELATED APPLICATIONS

The present application claims priority to U.S. Provisional Application 63/111,909, entitled: "AUTOMATED SPOOLING", and filed on Nov. 10, 2020, the entirety of which is incorporated by reference.

FIELD OF THE DISCLOSURE

Aspects of the disclosure relate to wireline, coiled tubing, and slickline operations for hydrocarbon recovery operations. More specifically, aspects of the disclosure relate to automated spooling mechanisms and methods for use in hydrocarbon recovery operations.

BACKGROUND

Wireline, coiled tubing, and slickline operations are used to perform different functions in a wellbore. Hydrocarbon recovery operations are expensive to perform, therefore, there is a push by the industry to cut costs related to such operations. Performing activities in the oil field in a cost-effective manner, however, can result in a rushed operation in a bid to result in well economic viability. With wireline, coiled tubing, and slickline operations, such rushed operations can lead to wireline, coiled tubing, or slickline entanglement, dropped loads and other problems. It is desired, therefore, to minimize the possible problems presented above while performing the highly needed activities.

As time has progressed automation has become more commonplace in specific industries. The purpose of automation is to reduce the number of workers performing a work task, improve the quality of the service, and accelerate delivery. Minimizing the number of workers can lead to increased savings for operations. To date, however, automation in the oil field is not as prevalent as in other industries.

There is a need to provide automated apparatus and methods that are easier to operate than conventional apparatus and methods.

There is a further need to provide apparatus and methods that do not have the drawbacks of increased costs and potentially fouled wireline operations.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting example embodiment, a system for automated spooling of a deployment unit is disclosed. The system may comprise a sensor and measurement system configured to measure a drum position, an elongated member length, a spooling pressure and a tension in the elongated member deployed by a system, such as a wireline unit, a coiled tubing unit, a slickline unit, or other unit for deploying an elongated member. The elongated member can be coiled tubing, slickline, wireline, or the like. The system may also comprise a data driven system identification system configured to accept and process data related to winch parameters, spooling guide parameters, truck parameters and site parameters. The system may further comprise a spooling arm interface or a linear carriage system configured to receive and process measurements from the sensor and measurement system. The system may further comprise a stochastic inference system configured to receive the processed measurements to calculate an elongated member position, a layer direction, a fleet angle and a radius. The system may also comprise an auto-spooling controller connected to the deployment unit and the data driven system identification system, where the auto-spooling controller is configured to interface with the stochastic inference system and control the deployment unit and the auto-spooling controller is configured to control actions of the deployment unit based upon a processing of data from the sensor and measurement system, the stochastic inference system, the spooling arm interface or the linear carriage system and the data driven system identification system.

In another example embodiment, a method to control a spooling of a drum of a deployment unit is disclosed. The method may comprise obtaining data related to a sensor and measurements system connected to the deployment unit. The deployment unit can be a wireline unit, a coiled tubing unit, a slickline unit, or the like. The method may further comprise processing the data obtained by the sensor and measurements system in a processing unit that makes a stochastic inference. The method may also comprise controlling an auto spooling of the drum of the deployment unit through an auto-spooling controller connected to the deployment unit based upon the stochastic inference.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments. It should also be noted that when the term "cable" is used in the figures that any elongated member can be used such as a cable, a wireline, a slickline, or a coiled tubing. It should also be noted that when the terms "arm angle controller", "arm controller", and spooling arm" are used in the figures that these terms refer to illustrative elongated member guides.

FIGS. 11A, 11B and 11C are a series of pictographic examples of effective fleet angle for a neutral position, a lagging fleet angle, and a leading fleet angle.

FIGS. 12A through 12E are a series of pictographic examples of a successful mode while spooling and failure modes while spooling.

Figure 1:
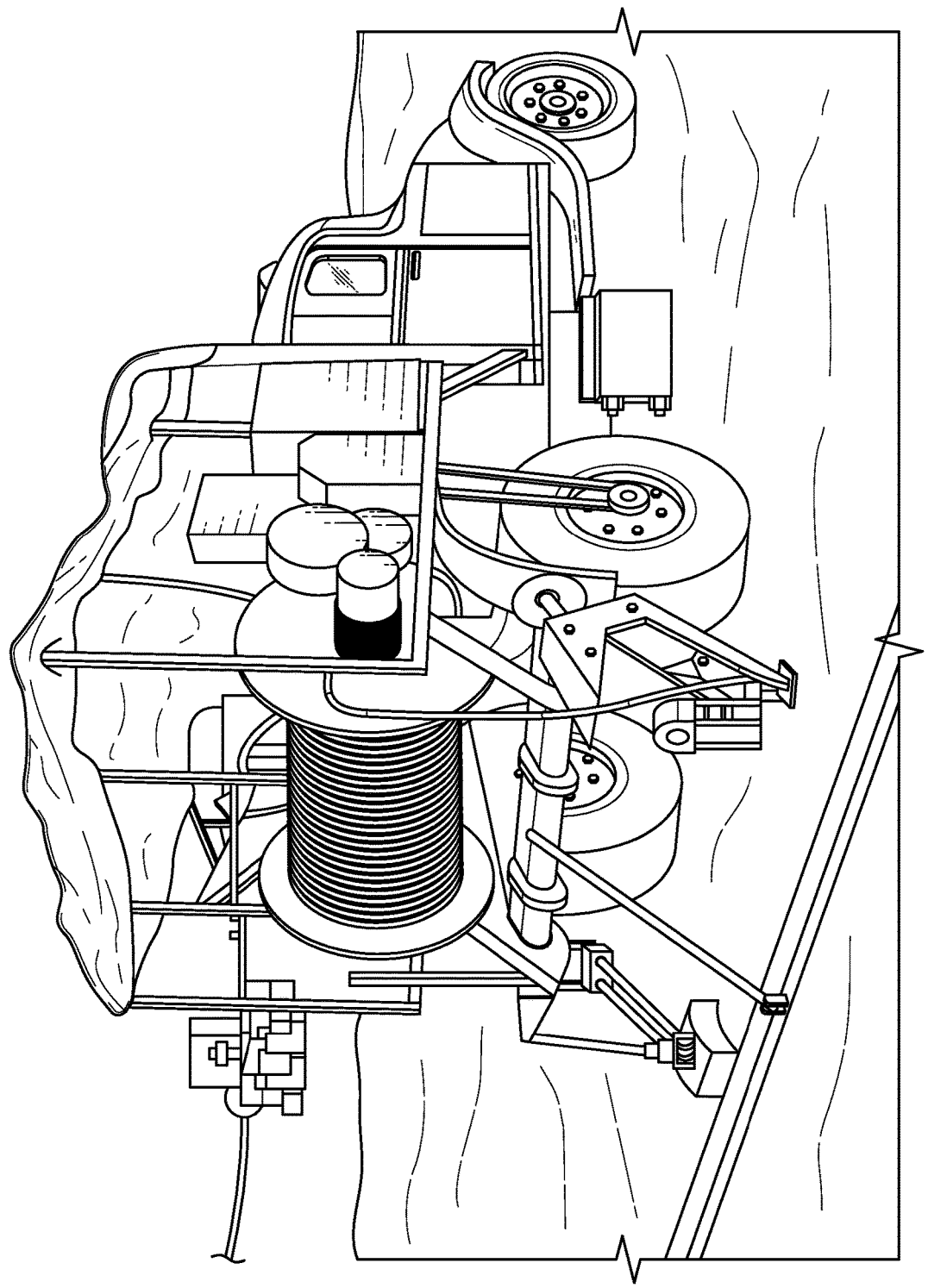
FIG. 1 is a picture of a conventional deployment unit that carries a measuring head and systems to control the fleet angle.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

To enable remote operations and automation of spooling operations to deploy/retrieve elongated members, such as mining operations, wellbore service operations, hoisting operations, ship mooring operations, or the like. For example, the disclosed methods and systems can be utilized with wellbore service jobs, wherein systems are designed to convey elongated members and sometimes tools connected therewith, such as wireline tools, coiled tubing tools, fishing tools, or the like, and retract them on the spool automatically without operator interaction. The process is known as "auto spooling". The main objective of auto-spooling, in its simplest form, is to maintain the fleet angle within a specific variable range throughout the spooling process. Due to challenges in obtaining a reliable direct measurement of the fleet angle, the fleet angle is estimated based on a several other measurements. The arm angle is also controlled (which is much easier to measure reliably) to obtain the desired fleet angle. This controller then works in tandem with an anomaly detection and classification system to create a fully autonomous spooling system. The anomaly prediction and detection are achieved through a combination of failure prediction with time series data from traditional sensors and failure detection using computer vision with deep neural networks. In addition to anomaly detection, the computer vision system also provides redundant measurements of critical variables necessary for the auto-spooling controller such as elongated member position and fleet angle.

The robustness of the auto-spooling controller relies heavily on reliable estimation of the state of the system and for this purpose, a probabilistic framework is devised for the spool state estimation. This framework relies on timeseries data collected from several existing sensors including the drum rotation and the tool depth in addition to the new measurement of the arm angle and a monocular camera for computer vision. The framework includes several inference algorithms that estimate all relevant variables such as elongated member position, layer direction, spool radius, flange position, etc. These variables and parameters are then fused probabilistically using Bayesian estimation theory in a Layer Chart (L-Chart) that keeps a log of all relevant layer properties and is used to estimate several spool parameters. The L-Chart is built to fuse and update measurements from various sources or measurements such as timeseries data, computer vision, or direct measurements to create a data-driven estimation of the state of the spool and eliminate manual initialization of the spooling controller.

A wellbore job can include conveying a tool string downhole and retrieving it using an electric cable, a slickline, a coiled tubing, or the like to acquire subsurface petrophysical and/or geophysical data and the delivery of well construction services. A deployment unit, e.g., a winch, can be used to convey the tool string downhole by unspooling and spooling the elongated member on a drum while controlling the fleet angle (the angle at which the elongated member enters the drum during spooling) using an elongated member guide, such as a spooling arm or linear carriage.

The spooling arm is a legacy spooling guide design used with deployment units that dates back to about a hundred years ago and it was initially used to carry the measuring head (IDW and CMTD) and roughly control the fleet angle to create a smooth spool as shown in FIG 1. Another advantage of such design on modern units is that it allows unspooling without resistance when in neutral mode.

Traditionally, a deployment unit is aligned with the wellhead manually at an optimal distance to facilitate the spooling process and reduce the involvement of the operator with the spooling process. This optimal configuration is not always guaranteed or possible and the operator will intervene to compensate.

Figure 2:
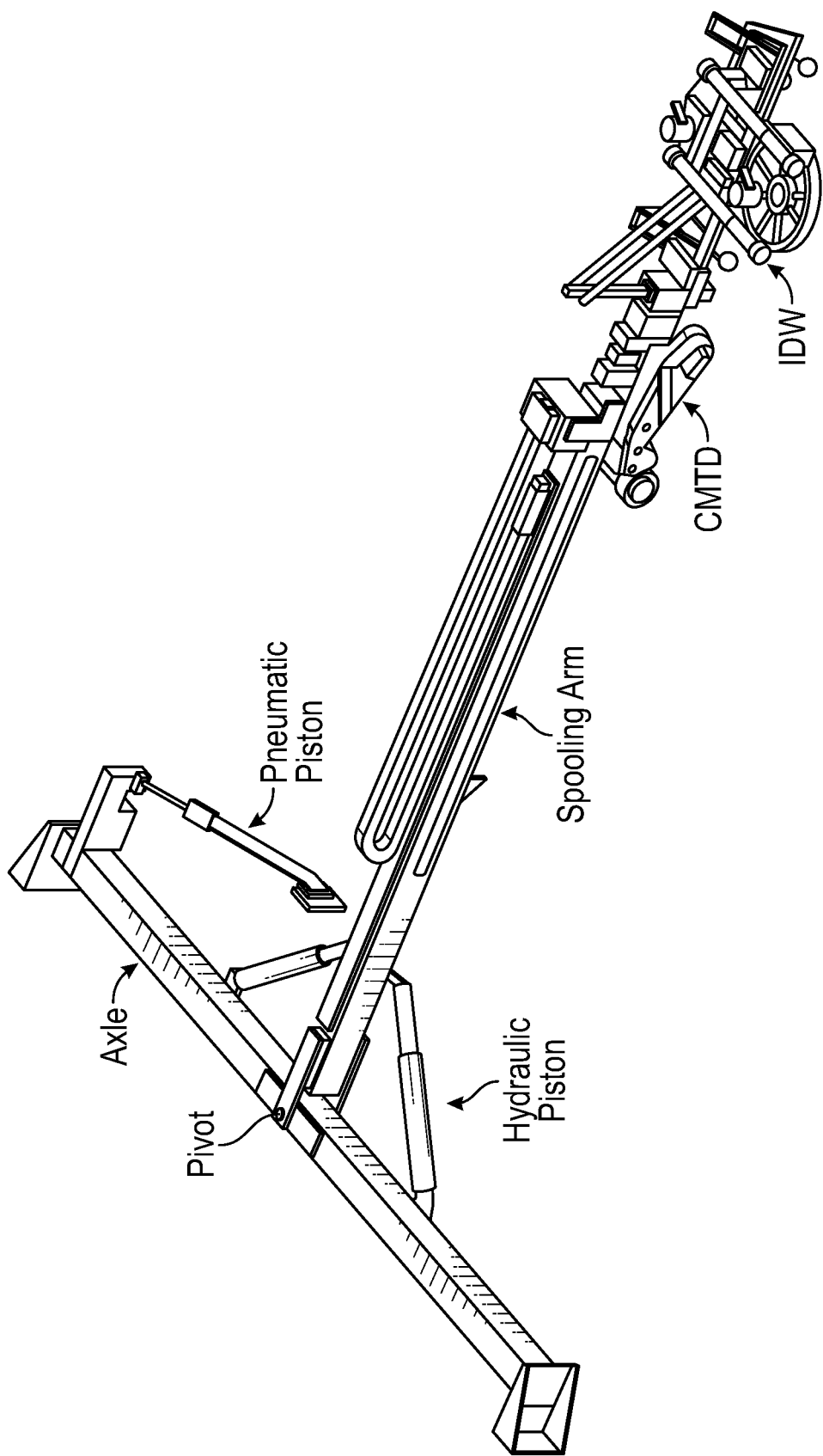
FIG. 2 is a side view of a spooling arm arrangement.

The spooling arm on deployment units rotates around two axes, the vertical rotation around the axle and the rotation around the arm pivot as shown in FIG. 2. The axle can be rotated via a pneumatic piston and the spooling arm can be rotated around the pivot with two hydraulic pistons as shown in FIG 2. During the spooling process, the arm is subjected to an external torque resulting from the tension in the elongated member and an internal torque applied by the pressure in the pistons. To control the arm, an encoder can be added to the arm pivot that measures the arm angle and is used for feedback control. The auto-spooling controller, which controls the fleet angle during the spooling process, controls the arm position directly by applying the necessary pressure to the pistons.

Figure 3:
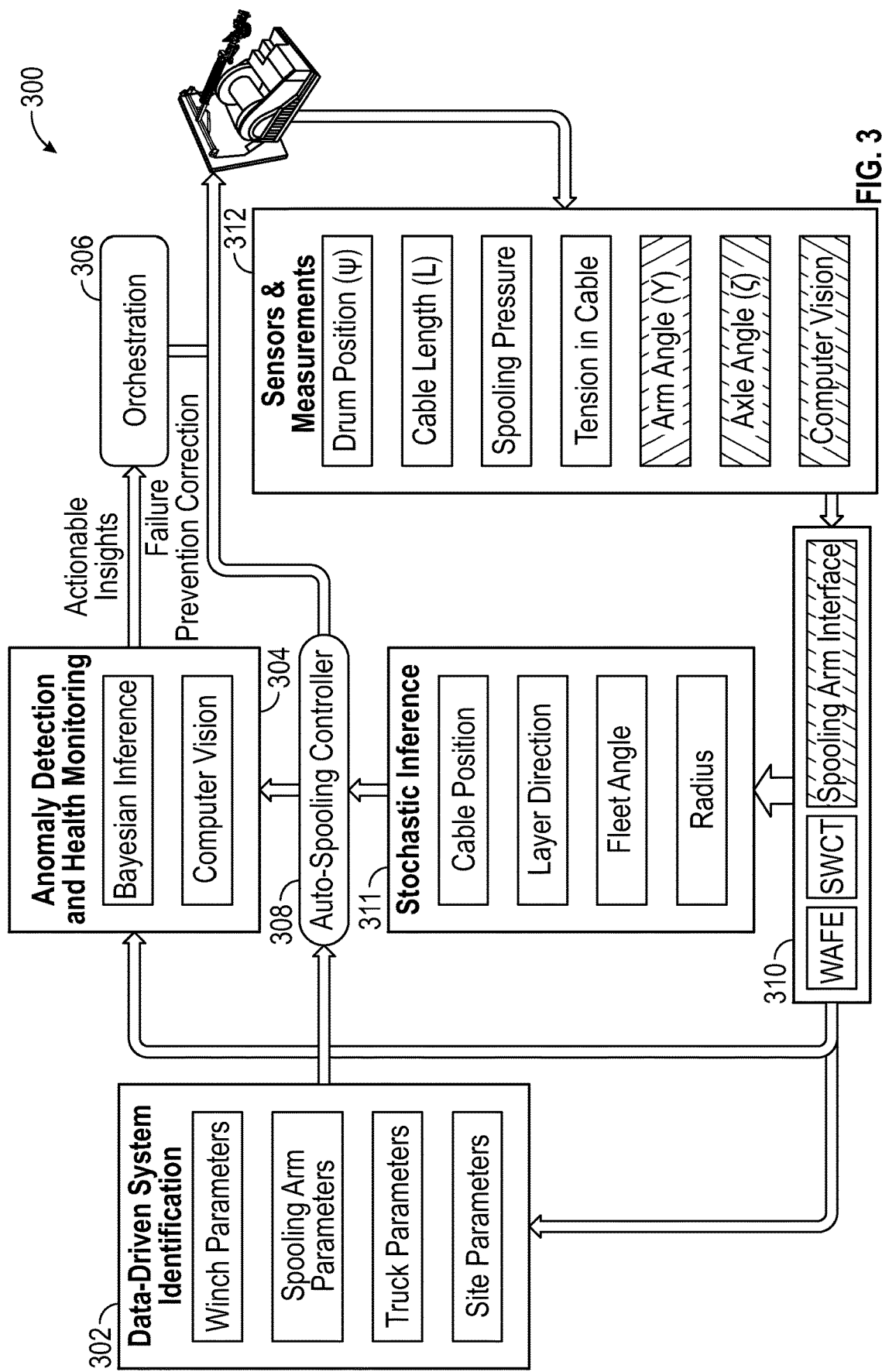
FIG. 3 is an overview of a spooling automation system.

Referring to FIG. 3, an overview of the spooling automation system 300 is illustrated. A data driven system identification system 302 is provided to monitor several parameters. These parameters may be winch parameters, spooling guide parameters, truck parameters, and site parameters. Data from the data driven system identification system 302 may be fed to an auto-spooling controller 308. An anomaly detection and health monitoring system 304 is provided to detect both errors that may occur within the system 300 and overall health monitoring functions for the system 300. To aid in the performance of these aspects, a computer vision system may be used. Such computer vision system may be a monitoring camera system. The camera system may use reference points identified with the deployment unit to provide a constant reference point, in some embodiments. A Bayesian inference system may also be included in the health monitoring system 304. The Bayesian inference system may help in determining statistical probabilities of certain occurrences happening. In this way, a specific course of action may be chosen by the system 300 to minimize anomalous actions. As illustrated, the auto-spooling controller 308 may feed data to the anomaly detection and health monitoring system 304. The anomaly detection and health monitoring system 304 may provide for actionable insights and failure or preventative correction analysis that is fed to an orchestration system 306 that controls functions of the deployment unit, such as the winch, drum and various arms. A sensor and measurement system 312 may also obtain and process data from sensors placed on various mechanical components. These may include measurements of drum position, elongated member length, spooling pressure, tension in elongated member, arm angle, axle angle as well as a separate computer vision tracking system. Data from the sensor and measurement system 312 may be provided to a spooling guide interface 310. A stochastic inference 311 is also provided to evaluate elongated member position, layer direction, fleet angle and radius as non-limiting embodiments.

Figure 4:
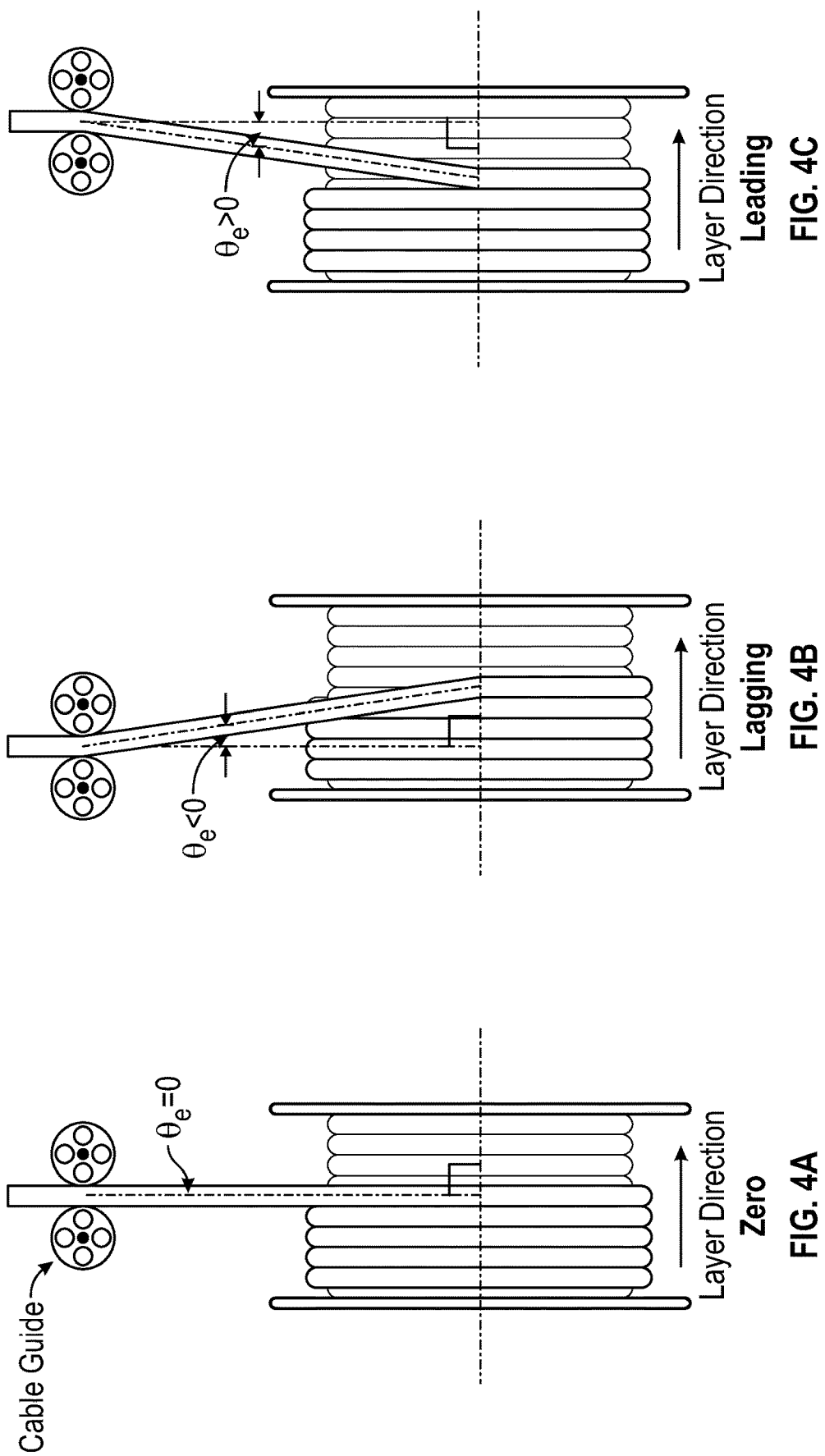
FIGS. 4A, 4B and 4C are a series of pictographic definitions of zero, lagging and leading fleet angles proceeding from left to right.

The objective of the spooling controller 308 is to automatically spool the elongated member on the drum in a prefect orthocyclic spool to prevent damage to the elongated member and improve its service life. Since it is not physically possible to directly control the state of the spool, instead the fleet angle is controlled. In embodiments, different aspects of the system are monitored such as the state of the spool. The state of the spool can be monitored for anomaly prediction and detection. The fleet angle is the angle at which the elongated member enters the drum as shown in FIGS. 4A, 4B, 4C, and it is the most critical variable to control during the spooling process.

The general solution of spooling automation consists of the required measurements and their interfaces, real-time state estimation, data-driven system identification, anomaly prediction and detection, and the auto-spooling controller in addition to a higher-level orchestration for failure correction.

Different measurements may be used including, for example, measurements on drum position, elongated member length measurement, spooling pressure, and the tension in the elongated member may be performed. Since it was not possible to build an automated spooling controller with the existing measurements, a sensor has been added at the pivot of the spooling arm to measure the arm angle and an additional sensor to measure the axle angle and improve the fleet angle estimation. In embodiments, a monocular camera is added for anomaly detection and to provide a redundant set of estimations for elongated member position, fleet angle, and drum speed. If a linear carriage is used, information from the linear carriage system, computer vision, and/or sensors in communication with the linear carriage system can be used to provide position information of the elongated member guide to allow for calculation of the fleet angle estimation.

For state estimation, a set of inference algorithms are established to estimate the states required for the controller such as the elongated member position, layer direction and spool radius to build a digital spool. These algorithms include a novel flange detection algorithm designed to detect and localize a flange crossing based on existing measurements such as the drum rotation, elongated member length measurement, and the arm angle or elongated member guide angle. The inference algorithms also include data fusion and construction of the digital spool (the L-Chart) which is then used to estimate elongated member position, spool radius, and layer direction. The L-Chart is also used to store information about the spooling process such as tension history, layer numbers, layer thicknesses and many other properties as function of drum rotation.

For anomaly prediction and detection, as provided in FIG. 3, 304, a combination of time-series data analysis and inference are used with a redundant computer vision system for detection. The anomaly prediction is achieved by estimating the fleet angle in real time and quantifying its uncertainty. The known properties of the system are also used and the bounds on failure angles (leading and lagging) are determined. These properties are combined with the rotation of the drum to estimate the probability of failure in real time.

A data-driven system identification 302 is used to improve the performance of the spooling controller 308 by inferring certain parameters and quantities such as wellhead position and spooling guide parameters. The spooling guide can be a spooling arm or an elongated member guide used with a linear carriage deployment system. The spooling guide parameters can include spooling arm parameters such as length, width, or other relevant information related to the spooling arm or parameters of an elongated member guide used with a linear carriage can include linear position, guide height, guide speed, or the like. One skilled in the art with the aid of this disclosure would know the parameters to measure with regards to the deployment system used.

Finally, the auto-spooling controller 308 can be developed to control the fleet angle in real time by consuming the state estimations and the parameter estimation and controlling the fleet angle indirectly by controlling the arm angle.

In some embodiments, the system can be designed to not only automate spooling, but to also track the state of the system and provide information about the spooling system 300 that can be used for predictive maintenance and health monitoring. The spooling system can be now known or future known systems, such as spooling systems using a spooling arm, spooling systems using a synchronized linear carriage, or the like.

Auto-Spooling Controller

The spooling controller 308 can be used to maintain the fleet angle within a specific range during the spooling process to minimize the probability of a spooling anomaly occurrence. This can be achieved by controlling the position of an elongated member guide such as spooling arm angle or the position of a linear carriage (e.g. fairlead, measure head . . . ). The optimal fleet angle profile is discussed in detail below where the fleet angle setpoint is determined based on the estimate of the elongated member position and the layer direction in real time.

For spooling guide that uses the spooling arm design, measuring and controlling the fleet angle $\theta$ directly is not trivial even with the use of monocular or stereoscopic computer vision. Instead, the auto-spooling controller is a closed-loop feedback controller that measures and controls the spooling arm angle $\gamma$ (see FIG. 5). The arm angle setpoint (reference) at each time step is calculated based on the desired fleet angle, the layer direction, and the current elongated member position on the drum. Once the desired fleet angle setpoint is determined, the current elongated member position and layer direction may be used in conjunction with the geometry and layout of the spooling system to determine the arm angle setpoint. This approach led to the development of three main controller blocks: a spool state observer, a fleet angle profile, and a setpoint calculation, and the fleet angle controller that determines the arm angle setpoint as shown in the general block diagram of the controller in FIG 7. The secondary controllers "torque controller" and "pressure controller" can be linearization functions derived from the arm characterization and calibration procedures or from the geometry of the arm.

Figure 5:
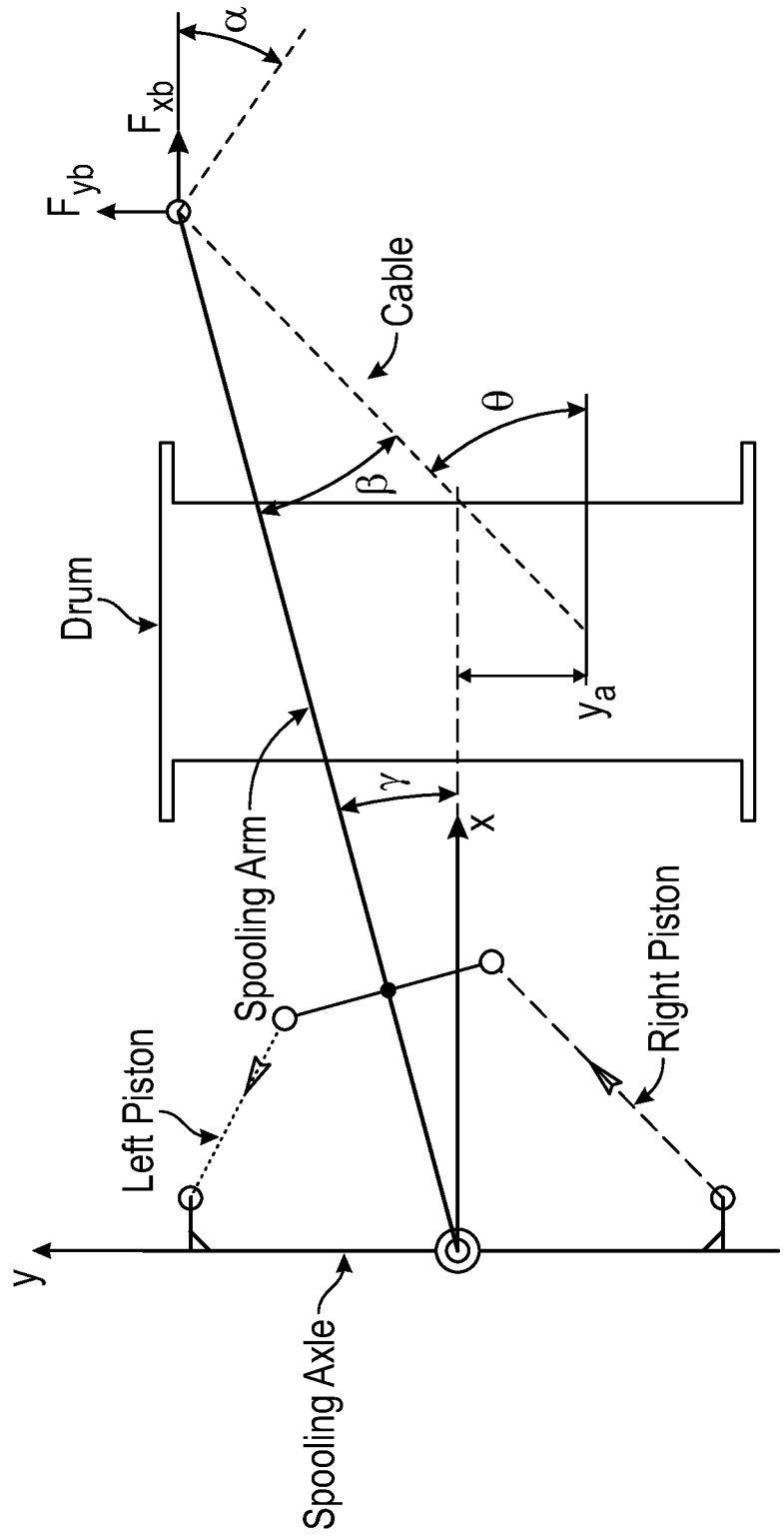
FIG. 5 is a view of main parameters and coordinate system of the spooling arm.
Figure 6:
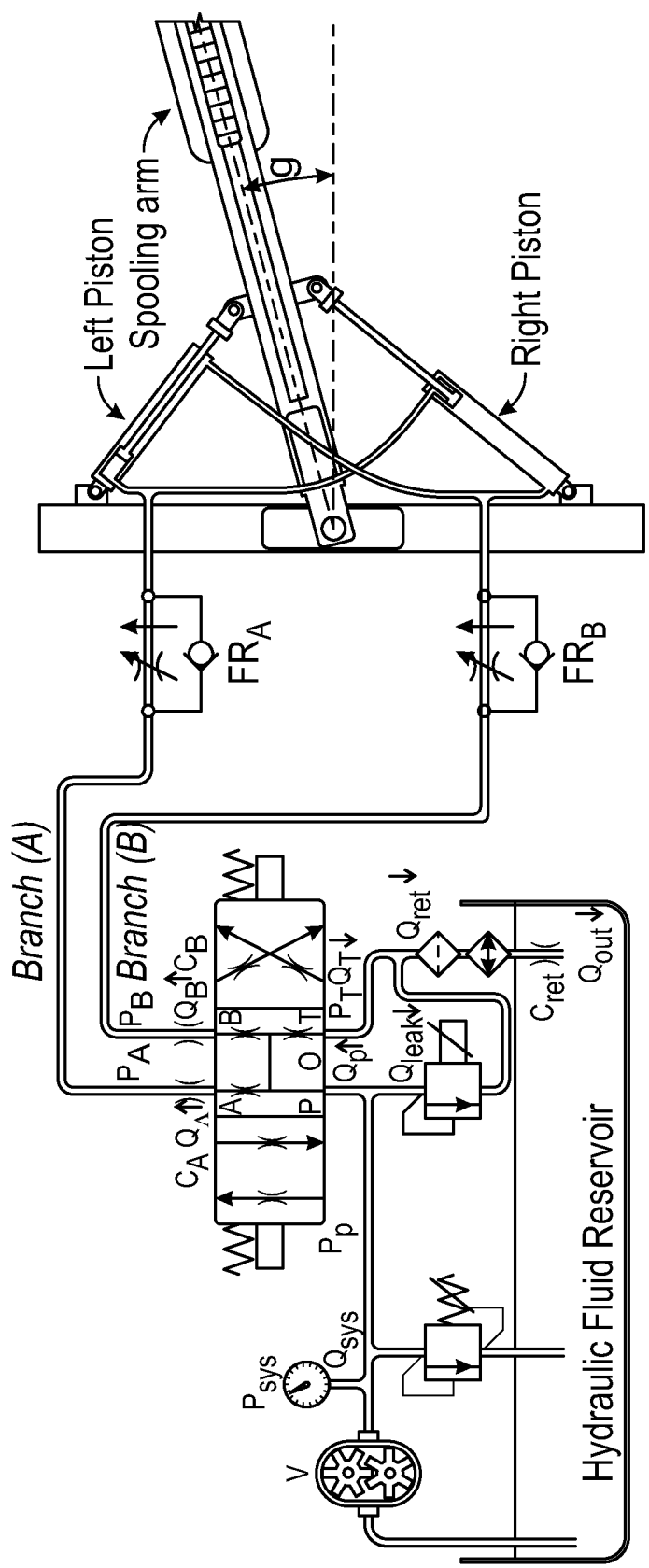
FIG. 6 is a side view of spooling arm hydraulics used in one example embodiment of the disclosure.
Figure 7:
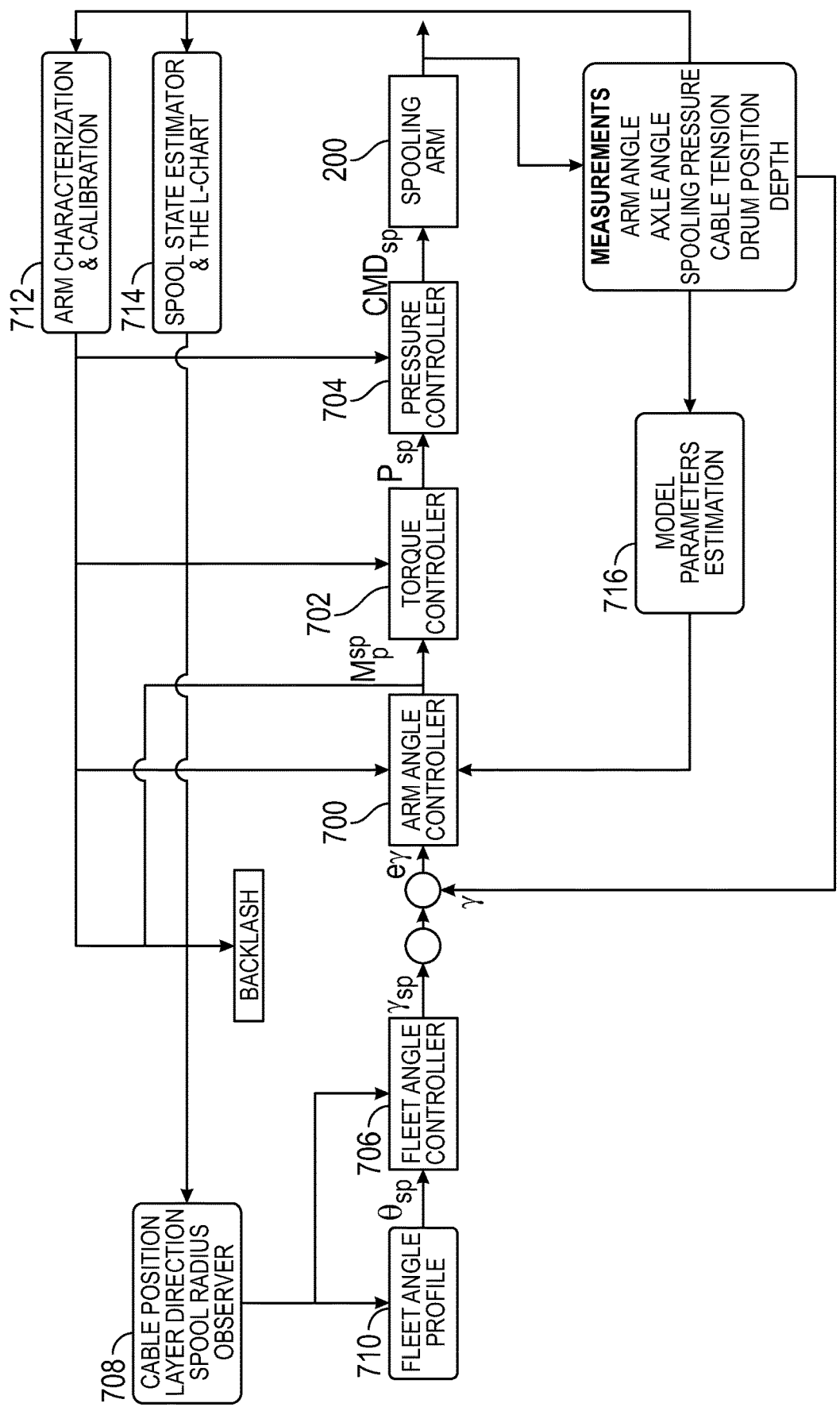
FIG. 7 is a general block diagram of an adaptive cascade controller that can be used in controlling operation of the systems for auto spooling.

For the spooling guide that uses the spooling arm design, the arm angle can be controlled by applying pressure to the hydraulic pistons shown in FIGS. 5 and 6. The arm command (shown as $CMD_{sp}$ in FIG. 7.) ranges between −1.00 to +1.00, where the magnitude corresponds to the proportional voltage applied to the proportional valve to control the pressure in the system and the sign of the command determines the direction of pressure application to move the arm to the right or the left. As illustrated in FIG. 7, a series of controllers may be used to provide commands for spooling guide 200 actuation. As shown, if the spooling guide is a spooling arm, an arm angle controller 700 can be provided to control spooling arm 200 actuation. Data from the arm angle controller 700 may be fed to a torque controller 702 and a pressure controller 704. Additional controllers include a fleet angle controller 706. To monitor and ensure positioning of components are correct, an elongated member position layer direction and spool radius observer 708 is provided. Additionally, a fleet angle profile 710 is provided. An arm characterization and calibration system 712 and spool state estimator 714 are also provided to accept and process data. The spool state estimator 714 may be configured with an L chart. Additionally, a model parameters estimation system 716 is provided to accept data measurements, such as arm angle, axle angle, spooling pressure, elongated member tension, drum position and depth and process this data to arrive at an estimation for a premade computer model of the system.

Figure 8:
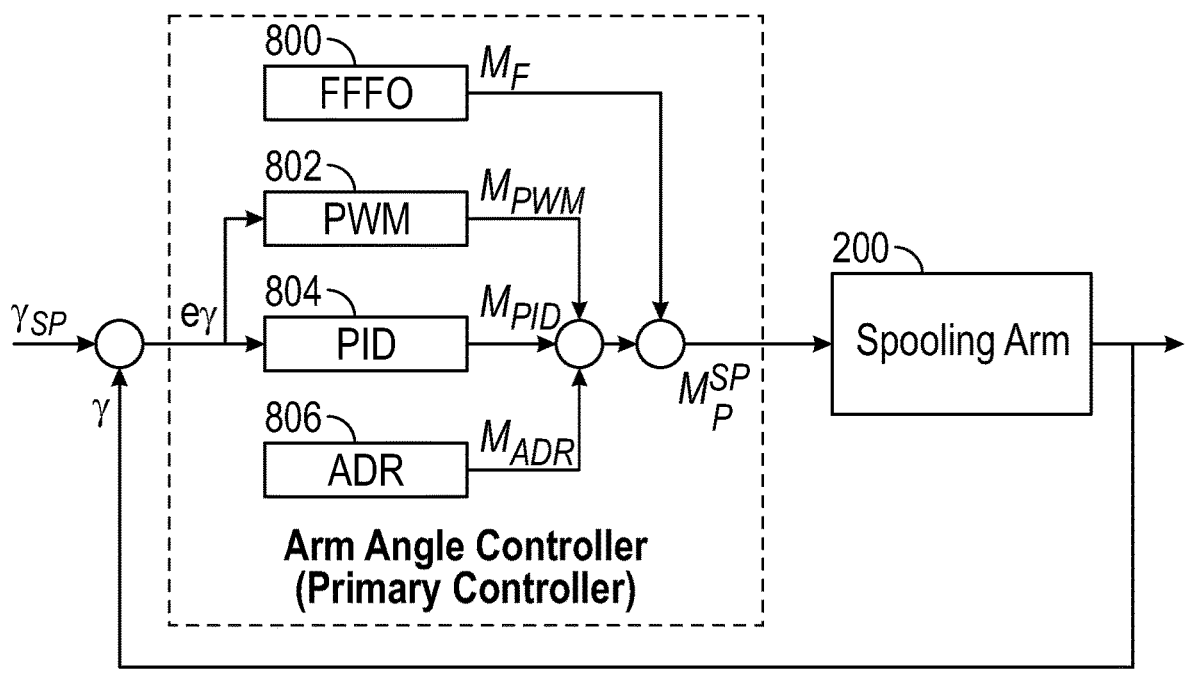
FIG. 8 is a diagrammatic view of an arm controller used in controlling operation of the systems for auto spooling.
Figure 9:
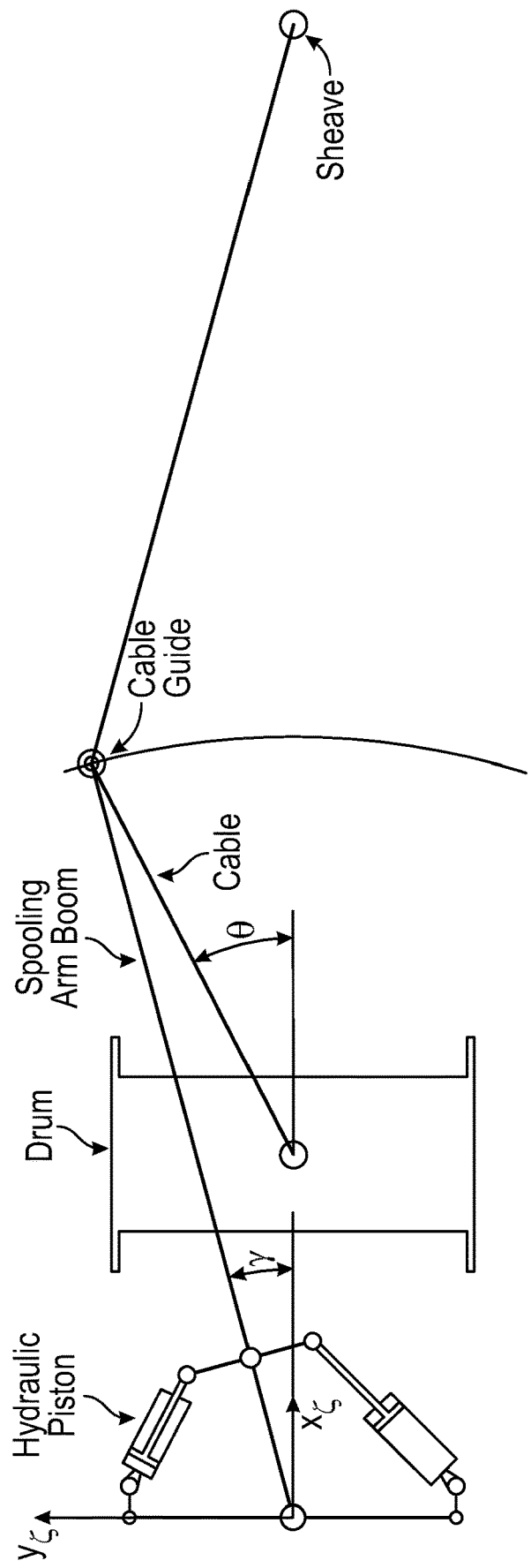
FIG. 9 is a diagrammatic layout of a winch system showing a spooling arm, drum, and elongated member.

Once the fleet angle setpoint is determined, the corresponding arm angle is calculated based on the geometry and is then combined with the backlash to calculate the desired arm angle setpoint. The arm angle controller then compensates for the residual arm angle error using different methods including a PID controller 804, a feedforward friction observer (FFFO) 800, pulse width modulation (PWM) 802, and an active disturbance rejection (ADR) 806 (see FIG. 8.). Due to changes in the PID gains based on the elongated member tension and arm angle, the gains are estimated based on the inferred system state that takes into account the predicted behavior of the system and the inferred parameters. FFFO 800 is used to compensate for the friction in the system including friction in the pistons and the arm pivot. The PWM 802 is designed to take into account the minimum pressure in the system and the corresponding minimum torque. Finally, the ADR 806 is designed to further improve the performance of the controller by predicting the required torque based on the state of the system and the inferred system parameters. The secondary controllers (torque 702 and pressure 704 controllers) are designed to compensate for the non-linearities in the system and can be open loop controllers based on the system identification or can be closed loop controllers if the proper bandwidth is available.

Optimal Fleet Angle Profile

The fleet angle is defined as the angle between the elongated member and the axis normal to the axis of rotation of the drum shown as $\theta$ in FIG. 9 and FIGS. 4A-4C. The fleet angle is known to directly influence the spooling quality and must be maintained within a specific range. This range is usually achieved by aligning the winch with the sheave wheel and by maintaining an optimal distance to prevent miss spooling. In case good alignment and optimal distance cannot be achieved, the elongated member guide is used to compensate for the fleet angle. In an embodiment when the spooling guide is a spooling arm, the spooling arm is controlled through pressure in the hydraulic piston at the pivot of the arm, and the fleet angle is achieved through force balance at the end of the spooling arm. If an elongated member guide associated with a linear carriage is used, then a elongated member guide mounted on the linear carriage can be used to control the fleet angle.

In an embodiment, if a linear carriage deployment system is used system controls the fleet angle by moving an elongated member guide or "cable" guide on a linear actuator powered by a power screw, a trapezoidal screw, a timing belt, a chained connection, or a reversible screw. The relative position of the elongated member guide with respect to the elongated member position on the drum determines the fleet angle. The elongated member guide position can be controlled based on the estimated elongated member position on the drum and the desired fleet angle setpoint. The position of the elongated member can also be estimated and controlled using computer vision.

Figure 10A:
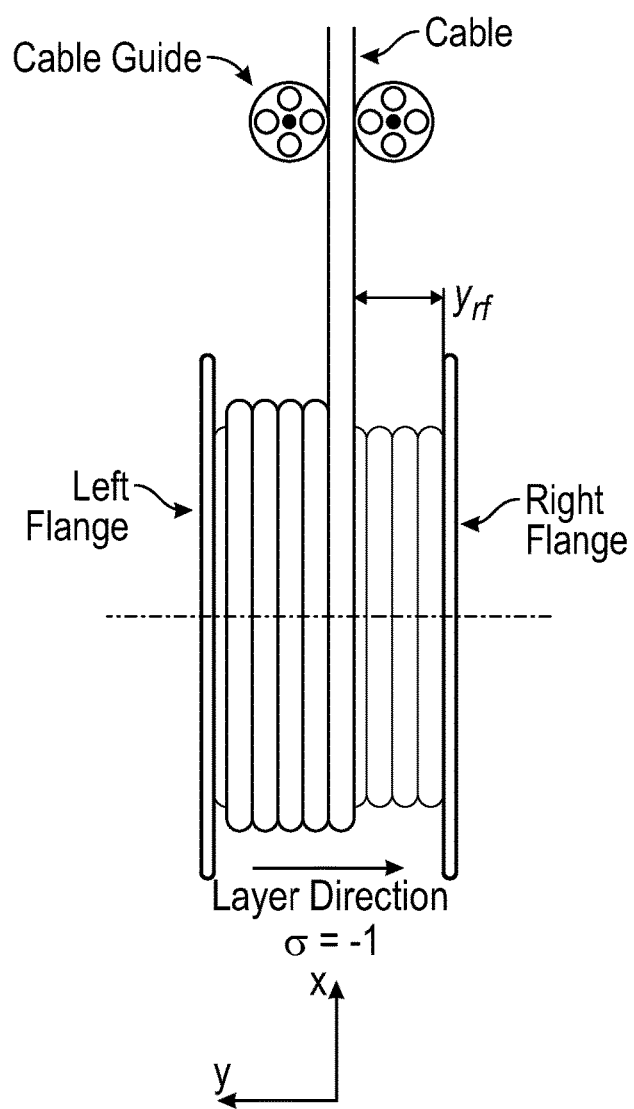
FIGS. 10A and 10b are a series of pictographic examples of layer direction.
Figure 10B:
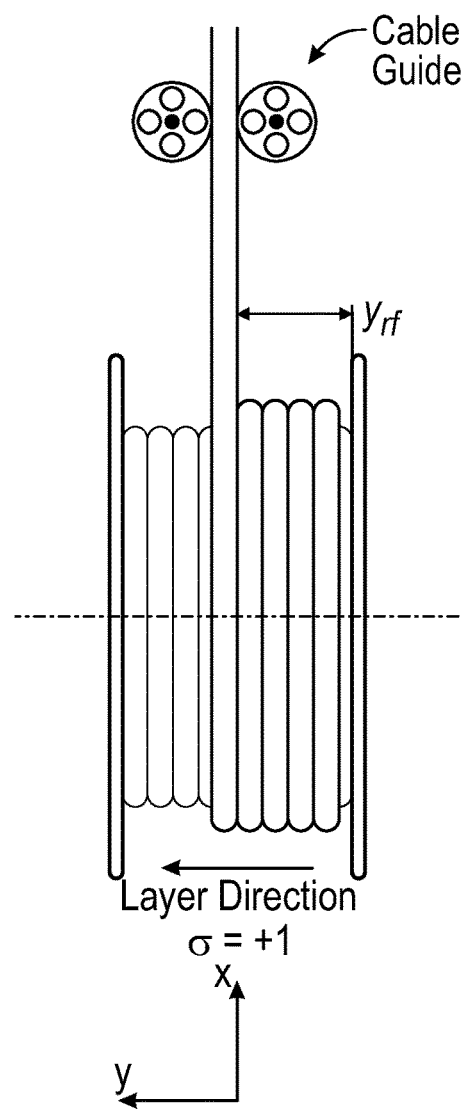

The second quantity necessary to develop an optimal fleet angle profile is the layer direction σ. The layer direction is defined as the relative position of the new wrap with respect to the previous wrap during the spooling process (not unspooling) and it is defined as positive when the spooling progression is in the +y direction and negative if spooling is in −y direction as shown in FIGS. 10A and 10B.

$$\sigma = \begin{cases} +1 & \text{when spooling from right to left } (+y) \\ -1 & \text{when spooling from left to right } (-y) \end{cases} \quad (1)$$

The effective fleet angle ($\theta_e$) is defined as the product of the fleet angle and the spooling direction:

$$\theta_e = \sigma * \theta \quad (2)$$

The effective fleet angle $\theta_e$ is negative when the elongated member guide (end of spooling arm/caster/fairlead) is lagging the current wrap, and it is positive when the elongated member guide is leading the current wrap as shown in FIG. 4B and FIG, 4C respectively. Referring to FIG. 11A, a zero effective fleet angle is illustrated. Referring to FIG. 11B, a lagging fleet angle is illustrated. Referring to FIG. 11C, a leading fleet angle is illustrated.

The range of the acceptable effective fleet angle is defined as $\theta_e \in (\alpha, b)$, where $\alpha$ is the limit on the lagging fleet angle (reverse-climbing limit) and b is the limit on the leading angle (gap limit), then $|\alpha| > b$ due to forces on the elongated member. Although the range is larger on the lagging angle, the elongated member must maintain a lagging angle (with a gap limit b) on the current layer at the flange to prevent pileup in the first wrap of next layer. If a lagging angle is maintained at the end of the current layer at the flange, it will form a leading angle at the beginning of the next layer. This property of the system suggests that the ideal fleet angle is not constant, but varies from a leading angle at the beginning of the layer for the first wrap to a lagging angle at the end of the layer.

In case the effective fleet angle away from the flange is too large $\theta_e < \alpha$, a reverse-climb will occur as shown in FIG. 12B and if $\theta_e > b$, a gap can form as shown in FIG. 12C, and if the elongated member is too close to the flange at the beginning of the layer, it can cause the elongated member to pile up at the flange as shown in FIG. 12D, and if $\theta_e > b$ when starting a new layer, this can lead to a runaway failure as shown in FIG. 12E. There are two less common modes of failure, the first is the knife-through which results from the increased spooling tension in higher layers, and the second is the micro-gaps which can happen as a result of migrating cross-over zone over time.

Bounds on the fleet angle can be determined by means of finite element simulations of spooling or by carefully collecting experimental data of spooling failures. In general, these bounds are function of elongated member diameter, friction between the elongated member and the spool, spool radius, spooling speed, tension in the elongated member, whether a flat or grooved drum is used for spooling, and flexural stiffness of the elongated member.

The fleet angle profile is a relationship between the desired fleet angle and the elongated member position and layer direction while taking into consideration the proximity of the elongated member to the flange. An optimal fleet angle profile is the profile that takes into consideration the robustness and reliability of the auto-spooling controller while minimizing the probability of failure and reduce scrubbing (abrasion) between the elongated member and the spool, if possible. As detailed previously, there are four modes of failure that are directly related to the fleet angle that must be considered when designing a fleet angle profile. In general, and based on these modes of failure, the effective fleet angle away from the flange must be maintained between the bounds a and b, $\theta_e \in (a, b)$ and must be maintained between 0 and b, $\theta_e \in (0, b)$ at the beginning of the layer in the proximity of the flange.

Figure 13:
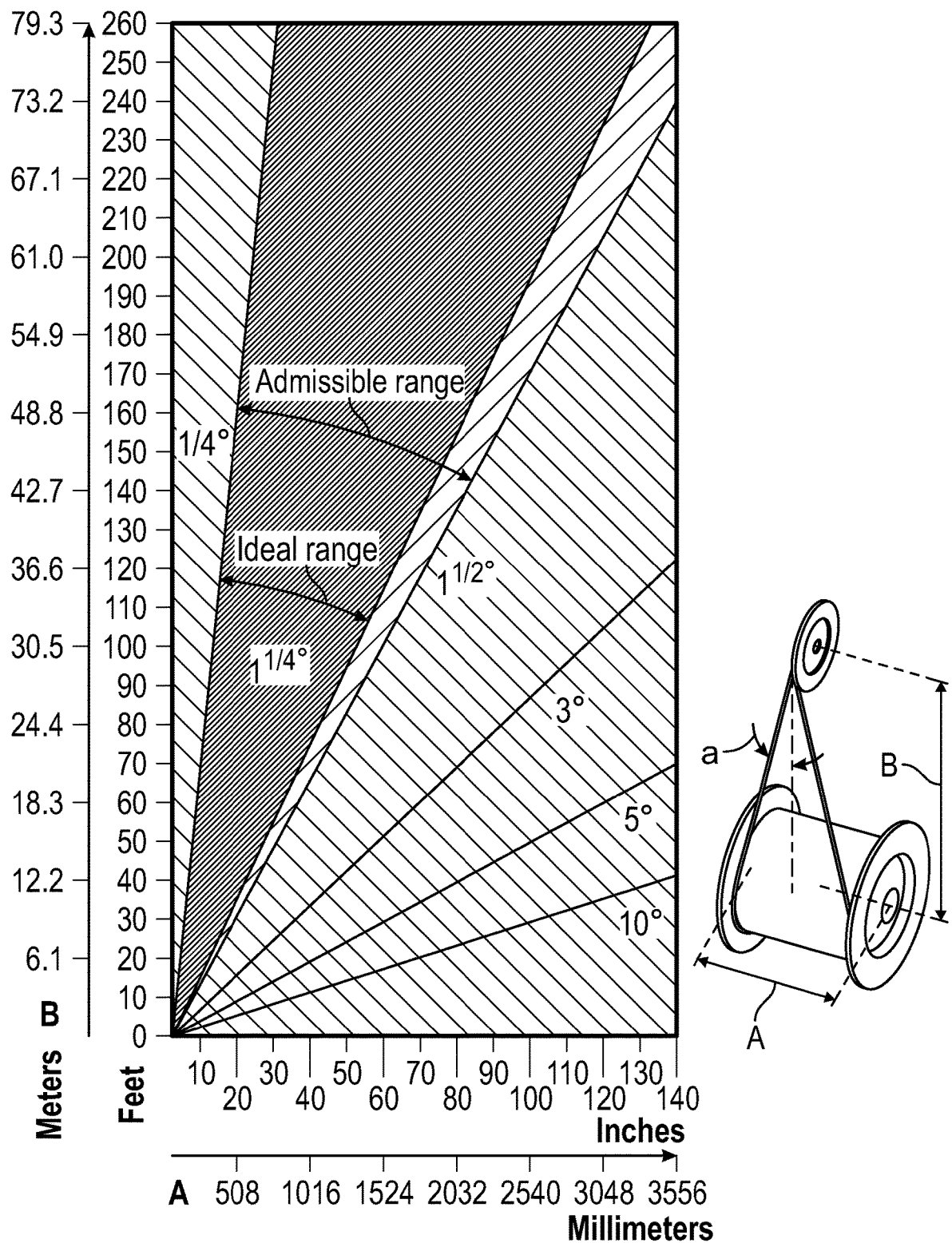
FIG. 13 is an ideal uncontrolled fleet angle profile.

For larger elongated member diameters and in the absence of the spooling guide, it is possible to create a smooth spool by aligning the winch with the well head and placing it at an optimal distance. This would create a linear fleet angle profile that is particularly suitable for shorter length scales (see FIG. 13). When ideal winch positioning is not possible or dealing with larger length scales and smaller elongated member diameters (such as wireline cable) a fleet angle compensation will be necessary to obtain the smooth spool.

There are several possible profiles that allow good spooling. One profile is the linear profile mentioned previously, but also a zero-fleet angle profile can perform the same job but might need a kicker plate at the flange of the drum to prevent pile up at the flange. Ideally, the most flexible profile can be parametrized to minimize the probability of failure while reducing scrubbing in the elongated member.

The optimal fleet angle must fall in the middle between the lagging bound and the leading bound to minimize the probability of failure. Since the magnitude of the lagging angle bound is larger than that of the leading angle bound, the optimal fleet angle designed to minimize the probability of failure is always a lagging angle. However, lagging angle cannot be maintained across the entire width of the drum due to failure modes at the flange (pileup and runaway).

Figure 14:
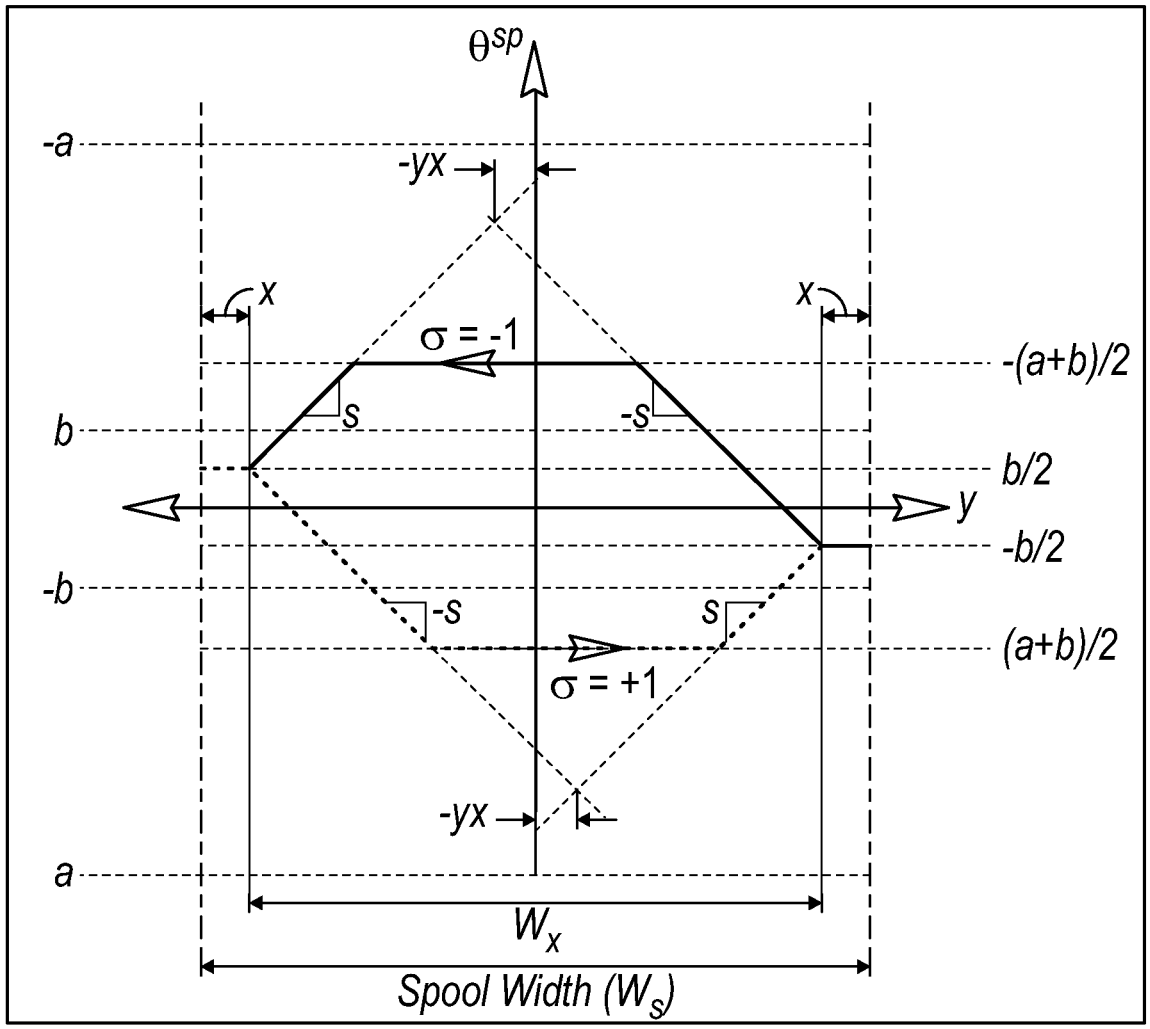
FIG. 14 is an example of an asymmetric fleet angle profile.

FIG. 14 shows an optimal fleet angle profile with the following parameters: x represents the uncertainty in elongated member position estimation. a is the lagging bound of the fleet angle. b is the leading bound of the fleet angle. And s is the slope of the linear segments and is chosen to create a smooth transition between the leading and lagging angle during the spooling process while taking into account the maximum speed at which the spooling controller can move the arm.

Flange Detection and Elongated Member Position Estimation

In one embodiment, for an automated spooling controller, the elongated member position, layer direction, and the spool radius are estimated in real time. The elongated member position and layer direction can be estimated directly using a computer vision system or a direct measurement of the elongated member position. Another possible method to obtain the elongated member position can be based on the rotation of the drum and flange-crossing detection. To estimate the elongated member position, layer direction, and build the digital spool, a flange detection is required to determine when the elongated member climbs or descends from one layer to the next. The flange detection can be achieved by different types of sensors such as mechanical switches or optical or proximity sensors. In one example embodiment, a flange detection algorithm is built based on the change in spool radius as function of elongated member length measurement and drum rotation.

There are several possible methods that can be used for flange detection such as change point or dynamic Bayesian networks. In one embodiment, a method is provided that performs a detection of flange crossing by comparing a linear regression of a data batch with a piecewise linear regression of the same batch and compare the residual error to determine the presence of a flange and detect the position of the flange at the same time.

In this method, the residual error from a linear regression is calculated and compared to the residual error of piecewise linear least squares fitting. A linear regression of the data batch is considered followed by an investigation of the residual error in presence and absence of a flange crossing in the data batch. In absence of a flange crossing from the data batch, the sources of error in a linear fit include random noise from the measurement of the drum position and the elongated member length and the number of data points in the data batch. In the presence of a flange in the data batch, the residual error includes the layer thickness, number of wraps, number of data points in the batch, and measurement noise.

In some embodiments, the accuracy of the algorithm can be further improved by using arm angle measurement and other predicted values such as the layer thickness.

Digital Spool and the L-Chart

To harness the power of spooling data for automation and health monitoring, a digital spool was built. The digital spool is a stochastic representation of the spool built by fusing data from all the available sensors with an initial model of the spool based on the dimensions of the drum and the elongated member. The initial model is then updated continuously to reflect the real spool every time a spooling or unspooling process is performed.

The spool model breaks the spool into layers where each layer is mainly defined by a starting and ending drum position (flange position). Each layer also includes information about that layer such as the layer thickness, number of wraps per layer, estimated pitch, elongated member length, elongated member diameter, tension profile of the layer, spool radius, number of layers and many other properties suited for automation and health monitoring.

Since the digital spool is built on the base of layers, it is referred to as the Layer Chart or shortly L-Chart. The initial spool can be constructed beforehand or after the first flange detection or an elongated member position measurement or using manual input by the operator. Once the initial spool model is constructed, it is updated with each flange detection or elongated member position measurement with the corresponding variance using the Bayesian estimation theory.

Whenever a flange is detected, the segmental linear regression algorithm discussed previously outputs the inferred flange position. These individual inferences are defined as the "measured flange positions" to distinguish them from the "believed flange positions" which are obtained by fusing the individual inferences. There are three challenges for the fusion:
 1. For every single flange, there could be multiple detections of the measured flange position, wherein each contains noise depending on the quality of the drum encoder. Also, detections for different flanges are not independent: The positions of two neighboring flanges give information on all other flanges, as they are evenly spaced in an ideal spooling.
 2. The measured flange positions may contain false positives. For example, when an anomaly occurs where the elongated member climbs on top of itself in the middle of the drum, the segmental linear fit algorithm will falsely infer that the elongated member has touched a flange to change a layer, and therefore outputs a false flange position.
 3. The drum rotation encoder occasionally outputs step drifts. For example, a linear increase drum angle time signal could contain a step increase in the middle. This leads to inconsistency between the flange positions detected before and after the drifts.

To address challenge 1, Bayesian inference is used to fuse the measured flange positions. Believed flange positions were tracked in terms of Gaussian distributions. Whenever a measured flange position arrives, the believes are updated by combining the prior (the distributions before the measurement arrives) and the likelihood (given a set of guessed flange positions, how likely we will receive such a measurement). To address challenge 2, a hypothesis Z test was performed for each measured flange position before fusing them into the current believes. A measurement that fails the Z test, i.e., one that is incompatible with the current believes, will be used to initialize a copy of the secondary believes, to be discussed in more details next. To address challenge 3, two copies (primary and secondary) are kept of the flange position believes. After an encoder drift, subsequent new measurements will disagree with the primary believes formed by earlier detections. Instead of filtering them out directly, they are stored in the secondary believes. Over time, if the secondary believes become more popular, it will overthrow the primary one. For the infrequent false positive detections, however, the secondary believes will never become popular as they are just outliers.

Figure 15:
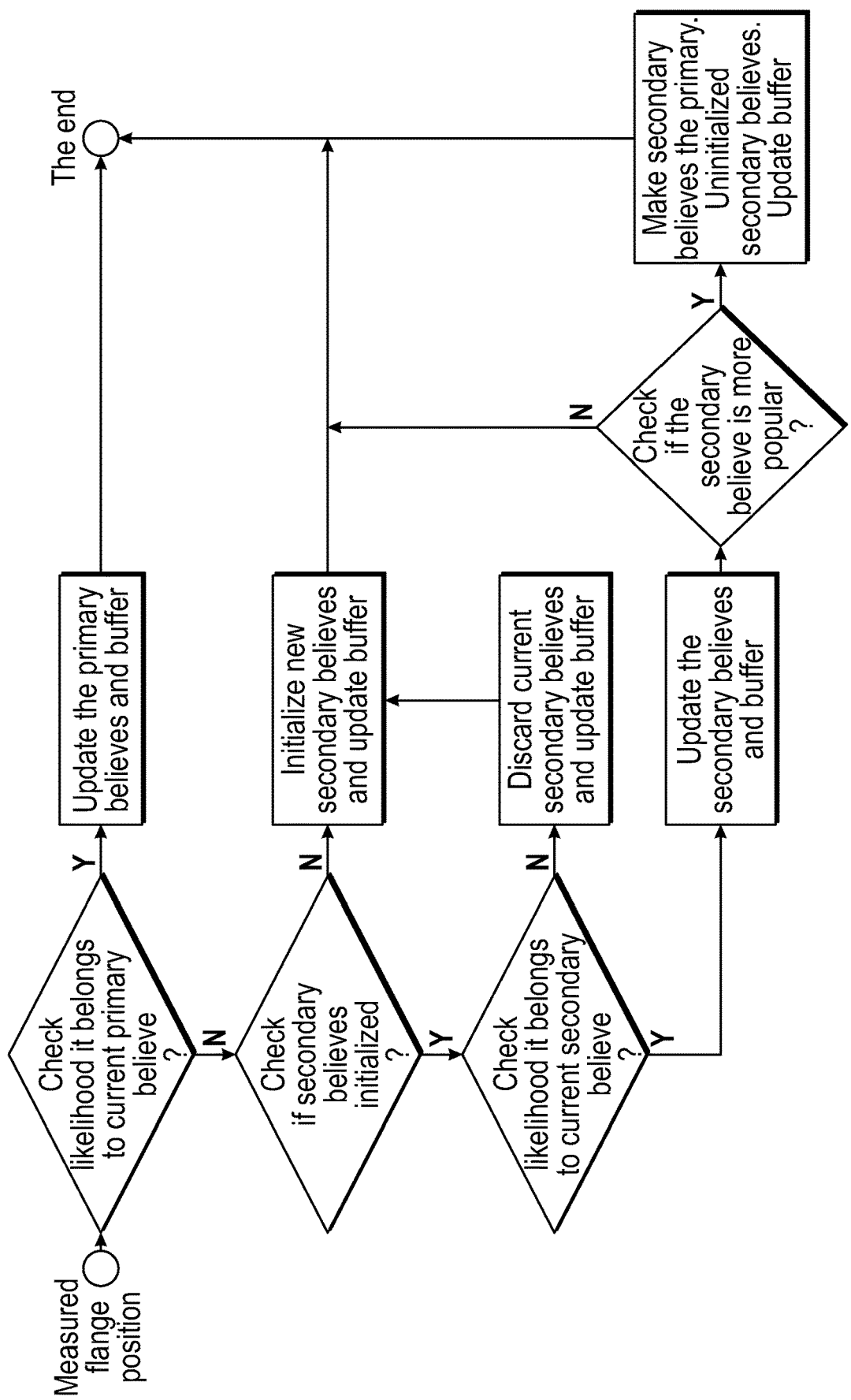
FIG. 15 is a flow chart for a fusion framework for updating flange position.
Figure 16:
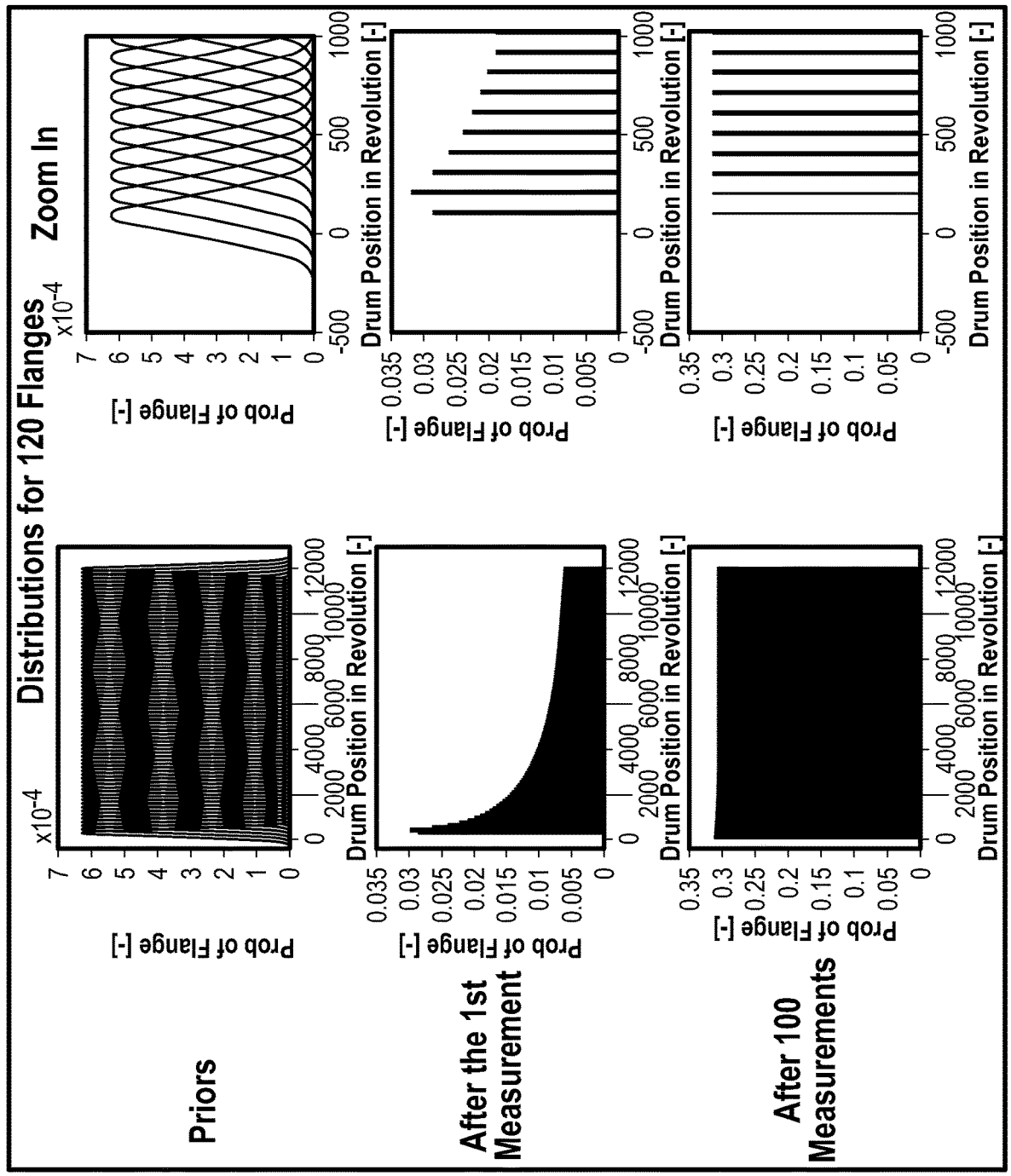
FIG. 16 is a set of example results for prior positions, after a first measurement position and after 100 measurement positions.
Figure 17:
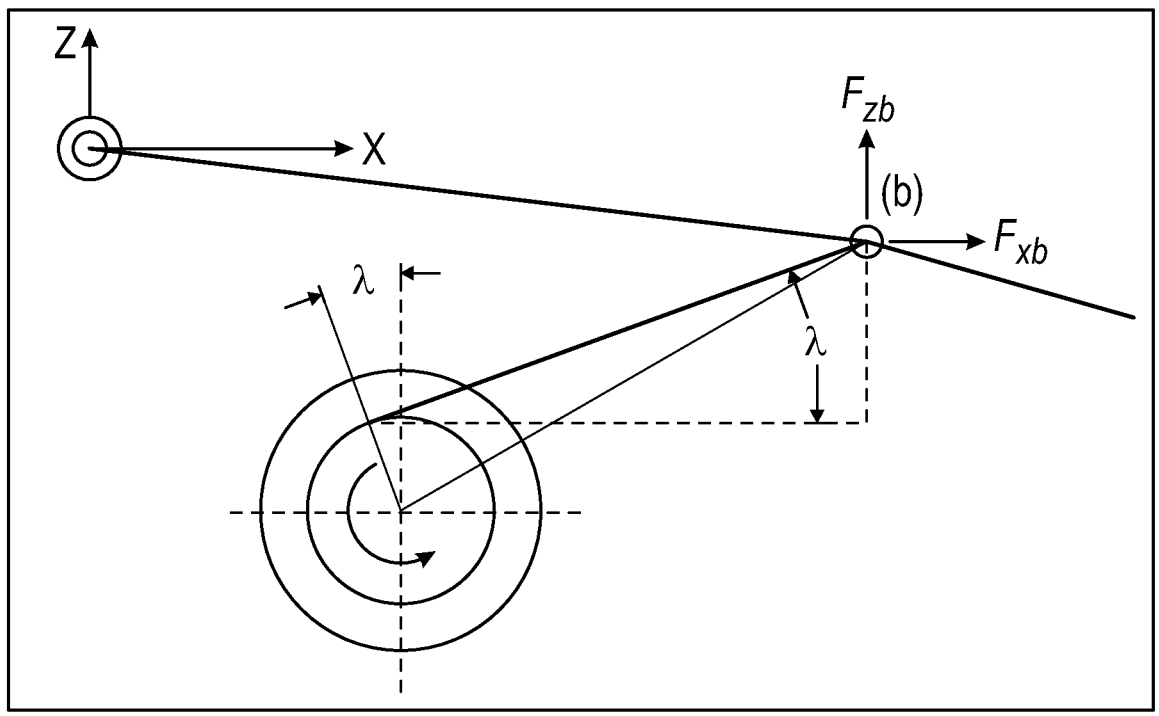
FIG. 17 is a side view of a position point making an angle $\lambda$ with the vertical.

FIG. 15 shows a flow chart of the fusion framework. FIG. 16 shows example results, where the top, middle and bottom panels show the distributions of the believed flange positions before receiving any measured flange position, after receiving 1, and 100 measured flange positions respectively. On each row of the figure, the left figure shows the believes of all the 120 flanges while the right figure shows a zoom in version of the first few distributions. As expected, the system becomes more confident on the flange positions upon receiving measurements as the distribution variances shrink.

Fleet Angle Estimation and Failure Prediction

Methods and Algorithms to Estimate the Fleet Angle and Quantify Uncertainty in Real Time To predict spooling failure from timeseries data, the fleet angle is estimated and compared to the known failure bounds associated with all failure modes. To determine the probability of the fleet angle being out of bounds, the estimated fleet angle distributions are convoluted with the likelihood of a failure mode given the current fleet angle estimation. The fleet angle out of bounds probability is calculated for each possible failure mode. Although the fleet angle being out of bounds is the direct cause of failure, it is not possible to cause a failure unless the elongated member is being spooled on the drum, or in other words, the drum is rotating. Hence the failure prediction is basically the probability of failure given a fleet angle estimation, failure bounds for each failure mode, and the drum rotation.

Fleet angle estimation is based on the arm angle, the axle angle, the current radius of the spool, the elongated member position, the arm length, and the position of the center of the drum with respect to the pivot of the arm. In order to estimate the fleet angle, the geometric relation between the variables mentioned above is established. Along with the fleet angle estimate, it is also important to quantify the uncertainty in this estimate as a function of uncertainties of the input. In summary, the fleet angle estimate, which is a distribution with a mean and variance, is estimated using the input mean and variances of the quantities that it depends on.

The uncertainties in the argument variables are then propagated to understand the uncertainty in the fleet angle estimate. Several methods were investigated for this purpose such as particle filters, Monte Carlo method, derivative methods, and an unscented Kalman filter (UKF). The UKF proved to be the best compromise between speed and accuracy.

Figure 18:
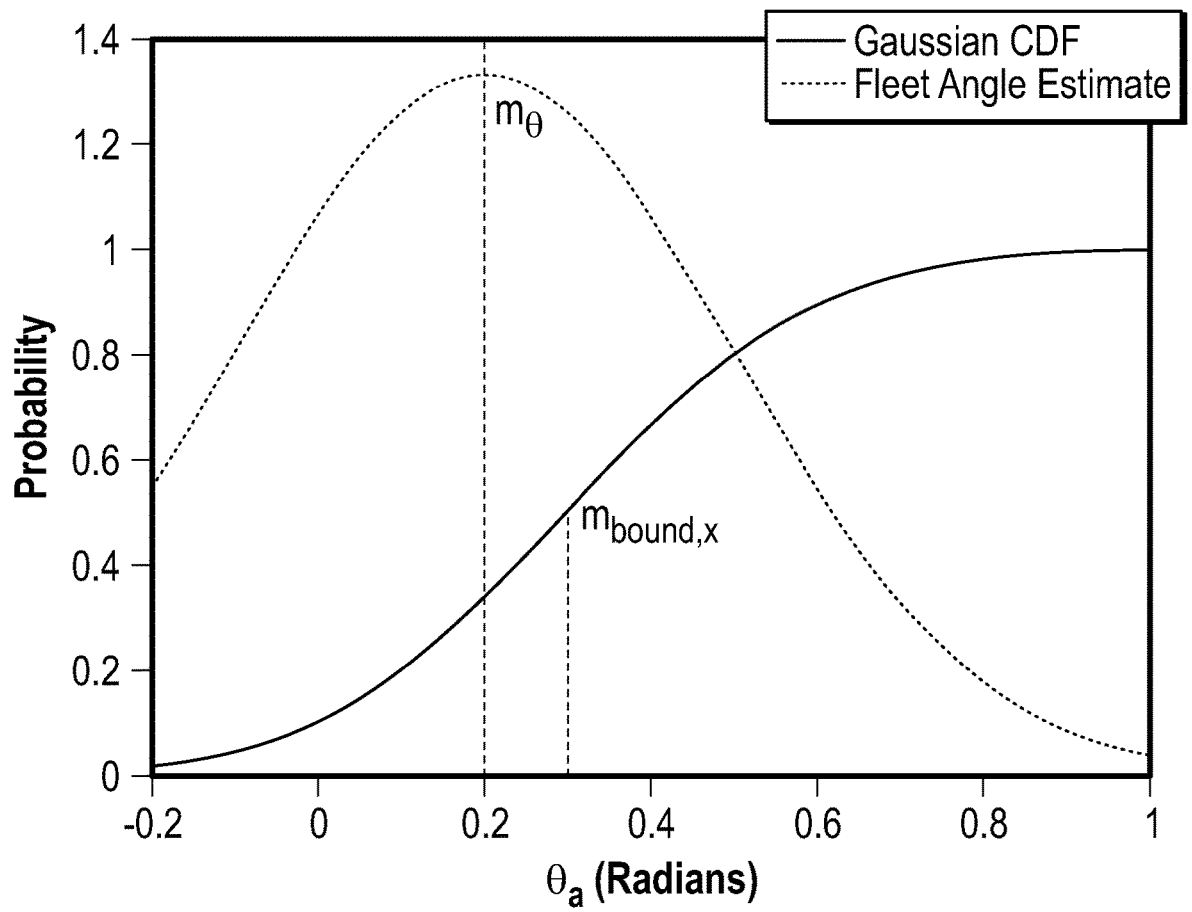
FIG. 18 is an estimate of theta angle and Gaussian CDF values for a typical gap failure.

A likelihood function of Gaussian CDF is assumed for the probability of failure (out of bounds) given a fleet angle as shown in FIG. 18 below. For example, say the gap anomaly occurs at a fleet angle of 3.15°±0.5°. Hence, the probability of the fleet angle being out of bounds for a given anomaly type is calculated by convolution of the fleet angle distribution and the likelihood function.

Data Driven System Identification

Data-driven system identification is employed to improve the performance of the controller by inferring some of the critical parameters and variables such as the wellhead position, friction torque, arm backlash, relationship between pressure and torque, etc.

The estimation of the well head position is discussed herein which can improve the performance of the controller by improving the active disturbance rejection. Wellhead position estimation also plays a critical role to assess the positioning of the deployment unit with respect to the wellhead and to determine the ability to spool under high tension. Several methods were investigated for wellhead position estimation including neutral unspooling data analysis, swing test, and real time estimation for controlled spooling.

The neutral unspooling approach relies on movement of the spooling arm during uncontrolled unspooling (RIH) due to tension in the elongated member. The spooling arm will follow the elongated member movement across the drum, and if we start by assuming absence of backlash and friction torque, then the can be assumed to form a straight line from a known elongated member position on the drum to the wellhead position. Based on the known geometry of the spooling system and assuming a fixed wellhead relative position, the wellhead position is estimated given the uncertainties in the geometry. This method is also used to estimate the friction torque and backlash in the spooling arm.

The swing test is performed when the drum is stationary with known elongated member position. In an example, if the spooling guide is a spooling arm a small and gradual pressure/torque is applied to the arm to the right then left while monitoring the arm angle measurement. If performed at different tension values at different depths, this method is used to estimate the well head position as well as the backlash and friction torque in the arm.

Real time estimation of the wellhead position, on the other hand, is performed during the controlled spooling or unspooling by monitoring the required pressure/torque to maintain the desired fleet angle under known tension. Static equilibrium between the tension torque and the pressure torque can be used to infer the wellhead position. A more accurate estimate is obtained using dynamic equilibrium to infer the wellhead position, friction torque, and backlash using an Unscented Kalman Filter.

In one non-limiting example embodiment, a system for automated spooling of a deployment unit is disclosed. The system may comprise a sensor and measurement system configured to measure a drum position, an elongated member length, a spooling pressure and a tension in an elongated member of the deployment unit. The system may also comprise a data driven system identification system configured to accept and process data related to winch parameters, spooling guide parameters, truck parameters and site parameters. The system may further comprise a spooling guide interface configured to receive and process measurements from the sensor and measurement system. The system may further comprise a stochastic inference system configured to receive the processed measurements to calculate an elongated member position, a layer direction, a fleet angle and a radius. The system may also comprise an auto-spooling controller connected to the deployment unit and the data driven system identification system, wherein the auto-spooling controller is configured to interface with the stochastic inference system and control the deployment unit, and the auto-spooling controller is configured to control actions of the deployment unit based upon a processing of data from the sensor and measurement system, the stochastic inference system, the spooling guide interface and the data driven system identification system.

In another example embodiment, the system may further comprise an orchestration system connected to the deployment unit and configured to alter at least one function of the deployment unit. The system may also comprise an anomaly detection and health monitoring system connected to the auto-spooling controller, wherein the anomaly detection and health monitoring system is configured to identify an anomaly and send data to the orchestration system.

In another example embodiment, the system may be configured wherein the orchestration system is further configured to vary at least one mechanical function of the deployment unit based upon a health monitoring command generated by the anomaly detection and health monitoring system.

In another example embodiment, the system may be configured wherein the varying the at least one mechanical function of the deployment unit is through at least one of an actional insight and a failure preventative correction message.

In another example embodiment, the system may be configured wherein the sensor and measurement system includes a computer vision system.

In another example embodiment, the system may be configured wherein the anomaly detection and health monitoring system is configured with a computer vision system.

In another example embodiment, the system may further comprise a Bayesian inference system within the anomaly detection and health monitoring system.

In another example embodiment, the system may further comprise an arm angle controller.

In another example embodiment, the system may be configured wherein the arm angle controller is configured with at least one of a feedforward friction observer, a pulse width modulation system and an active disturbance rejection system.

In another example embodiment, a method to control a spooling of a drum of a deployment unit is disclosed. The method may comprise obtaining data related to a sensor and measurement system connected to the deployment unit. The method may further comprise processing the data obtained by the sensor and measurement system in a processing unit that makes a stochastic inference. The method may also comprise controlling an auto spooling of the drum of the deployment unit through an auto-spooling controller connected to the deployment unit based upon the stochastic inference.

In another example embodiment, the method may be performed wherein the stochastic inference determines an elongated member position, a layer direction, a fleet angle and a radius value.

In another example embodiment, the method may further comprise obtaining visual data of the deployment unit through a computer vision system and wherein the visual data is processed by one of a spooling arm interface and the processing unit configured to make the stochastic inference.

In another example embodiment, the method may further comprise obtaining data related to at least one of winch parameters, spooling arm parameters, truck parameters and site parameters through a data driven system identification system, processing the data obtained by the data driven system identification system and transmitting the processed data to the auto-spooling controller.

In another example embodiment, the method may further comprise performing an anomaly detection on the deployment unit during the controlling the spooling of the drum of the deployment unit.

In another example embodiment, the method may further comprise using a computer vision system during the performing the anomaly detection on the deployment unit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A system for automated spooling of a deployment unit, comprising:
   a sensor and measurement system configured to measure a drum rotation, an elongated member length, an elongated member speed, a spooling pressure, an elongated member guide angle, an axle angle and a tension in an elongated member of the deployment unit;
   a data driven system identification system configured to accept and process data related to winch parameters, spooling guide parameters, truck parameters, and site parameters;
   a spooling guide interface configured to receive and process the measurements from the sensor and measurement system;
   a stochastic inference system configured to receive the processed measurements from the spooling guide interface to calculate an elongated member position, a layer direction, a fleet angle, and a radius; and
   an auto-spooling controller connected to the deployment unit and the data driven system identification system, wherein the auto-spooling controller is configured to interface with the stochastic inference system and control the deployment unit, and the auto-spooling controller is configured to control actions of the deployment unit based upon a processing of data from the sensor and measurement system, the stochastic inference system, the spooling guide interface, and the data driven system identification system.

2. The system according to claim 1, further comprising:
   an orchestration system connected to the deployment unit and configured to alter at least one function of the deployment unit; and
   an anomaly detection and health monitoring system connected to the auto-spooling controller, wherein the anomaly detection and health monitoring system is configured to identify an anomaly and send data to the orchestration system.

3. The system according to claim 2, wherein the orchestration system is further configured to vary at least one mechanical function of the deployment unit based upon a health monitoring command generated by the anomaly detection and health monitoring system.

4. The system according to claim 3, wherein the varying of at least one mechanical function of the deployment unit is through at least one of an actional insight and a failure preventative correction message.

5. The system according to claim 1, wherein the sensor and measurement system includes a computer vision system.

6. The system according to claim 2, wherein the anomaly detection and health monitoring system is configured with a computer vision system.

7. The system according to claim 6, further comprising a Bayesian inference system within the anomaly detection and health monitoring system.

8. The system according to claim 7, further comprising an arm angle controller.

9. The system according to claim 8, wherein the arm angle controller is configured with at least one of a feedforward friction observer, a pulse width modulation system and an active disturbance rejection system.

* * * * *